United States Patent
McGraw et al.

(10) Patent No.: US 6,423,661 B1
(45) Date of Patent: Jul. 23, 2002

(54) HIGH MOLECULAR WEIGHT POLYOLS, PROCESS FOR PREPARATION AND USE THEREOF

(75) Inventors: Philip W. McGraw; Paul E. Cranley; Robert H. Whitmarsh, all of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/657,157

(22) Filed: Sep. 7, 2000

Related U.S. Application Data

(62) Division of application No. 09/300,232, filed on Apr. 27, 1999, now Pat. No. 6,255,434.
(60) Provisional application No. 60/083,126, filed on Apr. 27, 1998.

(51) Int. Cl.$^7$ ............................................... C08G 65/10
(52) U.S. Cl. ........................ 502/170; 528/14; 528/25; 528/28; 528/38; 528/69
(58) Field of Search ............................ 502/170, 14, 25, 502/29, 69, 38

(56) References Cited

U.S. PATENT DOCUMENTS

| | | | |
|---|---|---|---|
| 3,532,645 A | 10/1970 | Schulze et al. ................. 260/2 |
| 3,654,183 A | 4/1972 | Klein et al. ................. 252/431 |
| 4,093,554 A | 6/1978 | Jayne et al. ................ 252/78.3 |
| 4,282,387 A | 8/1981 | Olstowski et al. .......... 568/618 |
| 4,302,343 A | 11/1981 | Carawell et al. ........... 252/33.4 |
| 4,312,768 A | 1/1982 | Nassry et al. ............... 252/32.7 |
| 4,326,047 A | 4/1982 | Yates ........................ 525/507 |
| 4,359,589 A | 11/1982 | Brownscombe ............. 568/618 |
| 4,391,722 A | 7/1983 | Schwartz et al. ............. 252/73 |
| 4,481,125 A | 11/1984 | Holgado ........................ 252/75 |
| 4,686,058 A | 8/1987 | Schwartz et al. ............. 252/75 |
| 4,702,854 A | 10/1987 | Synder et al. ................. 252/75 |
| 4,835,321 A | 5/1989 | Leach et al. ................. 568/618 |
| 4,837,401 A | 6/1989 | Hirose et al. ................ 525/364 |
| 4,959,169 A | 9/1990 | McGraw et al. .............. 252/68 |
| 4,985,491 A | 1/1991 | Reisch ........................ 524/875 |
| 5,068,304 A | 11/1991 | Higuchi et al. ............... 528/28 |
| 5,116,931 A | 5/1992 | Reisch et al. ................. 528/59 |
| 5,185,092 A | 2/1993 | Fukuda et al. ................ 252/56 |
| 5,220,046 A | 6/1993 | Leach et al. ................. 554/149 |
| 5,326,485 A | 7/1994 | Cervenka et al. .......... 252/32.7 |
| 5,386,045 A | 1/1995 | Weerasppriya et al. ..... 554/149 |
| 5,482,908 A | 1/1996 | Le-Khac ..................... 502/156 |
| 5,576,382 A | 11/1996 | Seneker et al. ............. 524/591 |
| 5,900,458 A | * 5/1999 | Fujita et al. |

FOREIGN PATENT DOCUMENTS

| | | |
|---|---|---|
| EP | 0 573 206 A1 | 12/1993 |
| EP | 0 743 093 A1 | 11/1996 |
| GB | 2147595 | 5/1985 |
| WO | 97/00133 | 1/1997 |

OTHER PUBLICATIONS

"High–molecular–weight poly(oxyethylene)", A.N. Tarasov et al., Institute of Chemical Physics, Academy of Sciences, U.S.S.R., Otkrytiya, Izobret., Prom. Obraztsy, Tovarnye, Znaki, 1977, 54(33), 208 (see attached abstract).

"Poly(oxyethylene)", G.P. Zaveryukha et al.; Otkrytiya, Izobret., Prom. Obraztsy, Tovarnye Znaki, 1976, 53(13), 92 (see attached abstract).

"Catalyst system for the suspension polymerization of ethylene oxide", A. Damusis; Wyandotte Chemicals Corp., Ger Offen., 25 pp. (see attached abstract).

* cited by examiner

Primary Examiner—Robert Dawson
Assistant Examiner—Marc Zimmer
(74) Attorney, Agent, or Firm—Norman L Sims

(57) ABSTRACT

The invention is a high molecular weight polyether polyol prepared by the reaction of one or more compounds having one or more active hydrogen compounds with one or more alkylene oxides in the presence of a catalyst comprising calcium having counterions of carbonate and a $C_{6-10}$ alkanoate in a solvent or dispersant which does not contain active hydrogen atoms. The polyether polyol prepared preferably has an equivalent weight of from about 1000 to about 20,000, a polydispersity of 1.3 or less and a residual catalyst level of from about 0 to about 2000 parts per million (ppm). In another embodiment the invention is a process for preparing such high molecular weight polyether polyols. The process comprises first, contacting one or more compounds having one or more active hydrogen atoms with one or more alkylene oxides in the presence of a catalyst. The catalyst comprises calcium having counterions of carbonate and a $C_{6-10}$ alkanoate in a solvent, wherein the solvent does not contain active hydrogen atoms. The mixture is exposed to conditions at which the alkylene oxides react with the compound containing more than one active hydrogen atoms such that a polyether polyol is prepared which has an equivalent weight of from about 1,000 to about 20,000, a polydispersity of about 1.3 or less and a residual catalyst level of from about 0 to about 1000 (ppm).

18 Claims, 1 Drawing Sheet

FIGURE 1. SIZE EXCLUSION CHROMATOGRAM OF POLYETHER POLYOLS MADE WITH DIFFERENT CATALYSTS
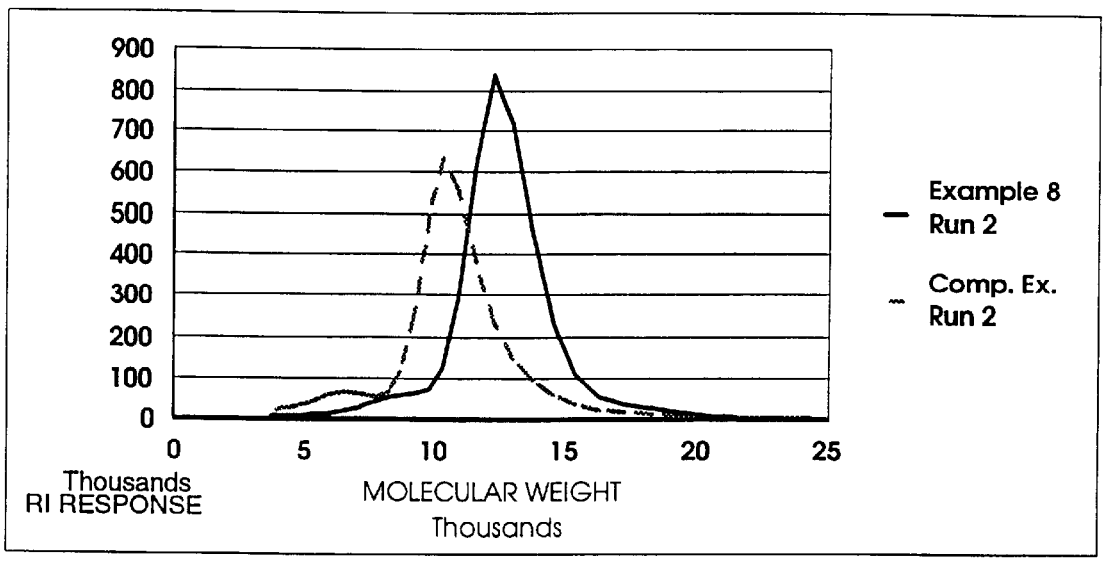

HIGH MOLECULAR WEIGHT POLYOLS, PROCESS FOR PREPARATION AND USE THEREOF

This a application is a divisional of application Ser. No. 09/300,232, filed Apr. 27, 1999, now U.S. Pat. No. 6,255,434 which also claims priorty from U.S. provisional application No. 60/083,126 filed on Apr. 27, 1999.

BACKGROUND OF THE INVENTION

This patent application relates to novel high molecular weight alkylene oxide based polyether polyols and a process for their preparation. This application further relates to the use of such high molecular weight alkylene oxide based polyether polyols to prepare prepolymers useful in high performance adhesives and elastomers. This invention further relates to high viscosity polyether polyols useful as lubricants. The invention further relates to high molecular weight polyether polyols useful as thickening agents in hydraulic fluids.

Polyether polyols used in preparing polyurethane adhesives and elastomers are usually prepared by reacting an initiator compound having a plurality of active hydrogen atoms with an alkylene oxide in the presence of basic catalysts such as tertiary amines, sodium and potassium hydroxides and sodium where a sodium derivative such as the alkylate of alkoxide is formed in situ. However, these catalysts must usually be removed by filtration and/or neutralization or other catalyst removal methods prior to use, particularly when prepolymers are to be prepared from such polyether polyols.

Olstowski and Nafziger, U.S. Pat. No. 4,282,387, issued Aug. 4, 1981, incorporated herein by reference, disclosed preparing polyols by reacting alkylene oxides with hydroxyl initiator compounds in the presence of catalysts of calcium, strontium, or barium salts of organic acids. These catalysts do not need to be removed before the resultant product is used in the preparation of polyurethanes. Such catalysts are generally available in a mineral spirit solvent which further contains monoether glycols. Such monoether glycols contain active hydrogen atoms and act as initiators. This results in the preparation of a mixture of polyols wherein some of the polyols are mono functional with respect to the hydroxyl group. The presence of mono functional polyether polyols decrease the physical properties of the elastomers that are made from them. They also form polyether polyols which have low molecular weight species and result in a high polydispersity. Polydispersity is defined as the weight average molecular weight divided by the number average molecular weight. A high polydispersity indicates that the polyether polyol prepared is a mixture of polyether polyols having a wide range of molecular weights. A high polydispersity and low molecular weight renders such polyether polyols unsuitable for high performance applications such as high performance elastomers and adhesives. Many of the polyether polyols prepared using such a catalyst system are initiated with a monofunctional glycol ether and are monofunctional, and therefore are not useful in high performance applications.

Yates et al. U.S. Pat. No. 4,326,047 discloses a process for preparing polyols using the catalysts described in Olstowski, wherein the catalyst is precipitated from the mineral spirits carrier and the glycol ether coupling agent. The resulting catalyst is solid. To be effective this catalyst must be redissolved in the reaction medium. This extra step takes time and negatively affects the productivity of the reaction and the polydispersity of the product prepared.

Hydraulic fluids are generally thickened with polyether polyols. In order to achieve the desired viscosity of such hydraulic fluids, it is often necessary to use a high concentration of polyether polyols in the water based hydraulic fluids. A common hydraulic fluid is ISO VG 46 hydraulic fluid which has a viscosity of 46 centistokes at 40° C. Most polyether polyols used in this application have a relatively low molecular weight. In order to prepare a hydraulic fluid meeting this requirement with these low molecular weight polyethers a concentration of from about 30 to about 70 percent by weight of polyether polyol is required. This formulation is expensive due to the need for such a high concentration of polyether polyols. There are known high molecular weight polyethylene oxide based polyethers used as thickening agents in hydraulic fluid available from Union Carbide under the tradename POLYOX WSRN-10™. These generally have a molecular weight of 100,000 or greater.

These can be used at a low concentration but exhibit poor shear stability and the fluid containing these polyethers is not shear stable and suffers from a reduction in viscosity during use. It would be desirable to have a high molecular weight polyether polyol which could thicken hydraulic fluid to the desired level at a significantly lower concentration and which is shear stable.

Some lubricants are designed to have a certain viscosities at 40° C., ISO VG 1000 lubricants demonstrate a viscosity of 1000 centistokes at 40° C. ISO VG 2000 lubricants demonstrate a viscosity of 2000 centistokes at 40° C. Polyether polyols made with basic catalysts generally do not have sufficient molecular weight to achieve the desired viscosities. High molecular weight polyether polyols which have sufficient viscosity to function as these lubricants are desired.

What is needed are high molecular weight polyether polyols which are useful in high performance applications. What is further needed is a process for the preparation of such high performance polyether polyols. What is also needed is a prepolymer useful in preparing high performance elastomers and adhesives prepared from such high molecular weight polyether polyols. What is further needed are high molecular weight polyether polyols which can be used as a thickener in water based hydraulic fluids and which are shear stable under lubricating conditions. What is needed is a high viscosity polyether polyol which can achieve the desired ISO VG 1000 and ISO VG 2000 viscosities.

SUMMARY OF THE INVENTION

The invention is a high molecular weight polyether polyol prepared by the reaction of one or more compounds having one or more active hydrogen compounds with one or more alkylene oxides in the presence of a catalyst comprising calcium having counterions of carbonate and a $C_{6-10}$ alkanoate in a solvent or dispersant which does not contain active hydrogen atoms. The polyether polyol prepared preferably has an equivalent weight of from about 1000 to about 20,000, a polydispersity of about 1.30 or less and preferably of about 1.2 or less and a residual catalyst level of from about 0 to about 2000 parts per million (ppm).

In another embodiment the invention is a process for preparing such high molecular weight polyether polyols. The process comprises first, contacting one or more compounds having one or more active hydrogen atoms with one or more alkylene oxides in the presence of a catalyst. The catalyst comprises calcium having counterions of carbonate and a $C_{6-10}$ alkanoate in a solvent, wherein the solvent does not contain active hydrogen atoms. The mixture is exposed to conditions at which the alkylene oxides react with the compound containing more than one active hydrogen atoms such that a polyether polyol is prepared which has an equivalent weight of from about 1,000 to about 20,000, a polydispersity of about 1.2 or less and a residual catalyst level of from morethan 0 to about 2000 (ppm).

In another embodiment, the invention is a hydraulic fluid comprising from about 1 to about 50 percent by weight of a polyether polyol as described above and from about 50 to about 99 percent by weight of water. Such polyether polyols allow the preparation of hydraulic fluids having the required viscosities with a lower concentration of polyether polyols incorporated into such hydraulic fluids than heretofore has been possible. Such polyether polyols are shear stable under conditions of use.

In yet another embodiment the invention is a lubricant composition comprising a polyether polyol as described hereinbefore.

In yet another embodiment the invention is a prepolymer comprising the reaction product of a polyether polyol as described before with an isocyanato silane having at least one silane moiety which has bonded thereto a hydrolyzable moiety.

The invention in another embodiment is a process for the preparation of a silyl terminated prepolymer. The process comprises contacting a polyether polyol as described herein with an isocyanato silane having at least one silane moiety which has bonded thereto a hydrolyzable moiety. The polyether polyol and isocyanato silane react under conditions such that the hydroxy moieties of the polyol react with isocyanate moieties of the silane so as to place a terminal silane moiety on the polyether polyol. The process is performed preferably without the addition of catalyst.

The process of the invention allows the preparation of high molecular weight polyether polyols which have a low polydispersity. The polyether polyols are useful in preparing polyurethane and reactive silicone functional prepolymers which are stable under ambient conditions. Such prepolymers are useful in preparing elastomers, sealants and adhesives.

BRIEF DESCRIPTION OF FIGURE

FIG. 1 illustrates the Gel Permeation Chromatography curves of two polyols, one polyol according to the invention and a second made according to the closest prior art.

DETAILED DESCRIPTION OF INVENTION

The polyether polyols of the invention are generally prepared by reacting an initiator, a compound having one or more active hydrogen atoms, with an alkylene oxide in the presence of a suitable catalyst under appropriate conditions for the alkylene oxide to react with the active hydrogen moiety of the initiator so as to add a series of ether units to the initiators thereby preparing a polyether polyol. Initiators which are useful in this invention are well known to those skilled in the art. Preferable initiator compounds which are,employed to prepare the polyether polyols are compounds having about 1 to about 8, preferably about 2 to about 8, more preferably about 2 to about 4, most preferably about 2 to about 3 active hydrogens. Preferable initiator compounds include, for example, alcohols, glycols, low molecular weight polyols, glycerin, trimethylol propane, pentaerythritol, glucosides, sugars, ethylene diamine, diethylene triamine, and the like. Particularly suitable glycols include ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol and various hexane diols, mixtures thereof and the like.

Alkylene oxides useful in this invention are well known to those skilled in the art and are disclosed in U.S. Pat. No. 4,326,047 and U.S. Pat. No. 4,282,387 relevant portions incorporated herein by reference. Preferred alkylene oxides include ethylene oxide, propylene oxide, 1,2-butylene oxide 2,3-butylene oxide, or hexene oxide. The most preferred alkylene oxides are ethylene oxide and propylene oxide with propylene oxide most preferred. Combinations of the above mentioned alkylene oxides may be used in random or block polymers.

The catalysts used in preparing the polyether polyols of this invention are calcium catalysts which contain both carbonate and $C_{6-10}$ oalkanoate counterions and preferably $C_8$ counterions. The catalyst is dispersed or dissolved in a dispersant or solvent which has no active hydrogen atoms capable of initiating a polyether. Preferably, the solvent or dispersant is a hydrocarbon or mixture of hydrocarbons and is soluble or dispersible in the polyether polyol and the components used to prepare the polyether polyol. In a more preferred embodiment, the solvent or dispersant is mineral spirits. Preferably the alkanoate counterions are $C_{6-10}$, and more preferably $C_8$ residues of organic acids. In a preferred embodiment the alkanoates are derived from substantially pure organic carboxylic acids. Preferably the pure carboxylic acids are synthetic, as synthetic carboxylic acids generally exhibit higher purities. The carbonate counterions result from contacting calcium and the organic carboxylic acid with carbon dioxide. The ratio of calcium ions to organic acid ions is from about 1:0.2 to about 1:1. Preferably the ratio is from about 1:0.3 and about 1:0.7. The catalysts may be prepared by contacting the appropriate ratio of calcium hydroxide with a $C_{6-10}$ carboxylic acid and bubbling carbon dioxide through the mixture to form carbonate moieties. The use of a solvent without active hydrogen atoms prevents the unwanted initiation of polyols with an undesired initator. The use of substantially pure organic acids is believed to enhance the polydispersity and performance of the resulting polyols in the applications described herein In the preparation of the polyether polyols of the invention, the initiator alkylene oxides and catalyst in an appropriate solvent are contacted. Typically such contacting takes place in the absence of oxygen and atmospheric moisture. Preferably, the contacting takes place under an inert atmosphere, such as nitrogen or argon. The ratio of initiator to alkylene oxide is chosen to achieve the desired molecular weight or equivalent weight of the polyether polyol. This ratio can be readily calculated by one skilled in the art. The amount of catalyst used should be sufficient such that the residual catalyst remaining in the polyether polyol upon completion of the reaction is above 0 ppm, more preferably 200 ppm or greater and most preferably 300 part per million or greater. Preferably the amount of catalyst used is chosen such that the amount of catalyst left in the polyether polyol upon completion of the reaction is about 2000 ppm or less and more preferably about 1000 ppm or less. In the embodiment wherein the polyether polyol is used to prepare elastomers, the resulting high molecular weight polyether polyol preferably contains a residual catalyst amount of about 200 ppm or greater, more preferably about 300 ppm or greater and most preferably about 400 ppm or greater. Preferably the residual catalyst level is about 1000 ppm or less more preferably about 800 ppm or less, even more preferably about 600 ppm or less, and most preferably about 500 ppm or less. In some embodiments where the polyether polyol is used to prepare elastomers it may be desirable to remove all of the residual catalyst. In the embodiment wherein the polyether polyol is used in a hydraulic fluid or a lubricant the resulting high molecular weight polyether polyol contains a residual catalyst amount of about 200 ppm or greater, more preferably about 300 ppm or greater and most preferably about 400 ppm or greater. Preferably the residual catalyst level is about 2000 ppm or less, more preferably about 1000 ppm or less, even more preferably about 800 ppm or less, and most preferably about 600 ppm or less.

In some embodiments it may be desirable to remove the residual catalyst from the polyether polyols of the invention. This can be achieved by contacting the polyether polyol of the invention with magnesium silicate or phosphoric acid and filtering the polyol with diatomaceous earth. The complex of the calcium catalyst and the additives are removed on the filter material. In those embodiments where the calcium is removed the resulting parts per million of the catalyst remaining in the polyol can be 0.

The reactants are reacted preferably at a temperature or about 90°C. or greater, more preferably about 100° C. or greater and most preferably about 110° C. or greater. The reactants are reacted preferably at a temperature of about 150° C. or less, more preferably about 130° C. or less and most preferably about 120° C. or less. The reactants are contacted for a time sufficient to prepare the desired high molecular weight polyether polyol. The reaction time is controlled by the feed rate, reactor size, catalyst concentration. and temperature. One skilled in the art can determine the appropriate time based on these variables. The unreacted alkylene oxides and any solvents may be removed from the reaction by stripping them off using means well known to those skilled in the, art.

In the embodiment wherein the polyether polyol is used to prepare elastomers, the polyether polyol preferably has an weight average molecular weight of about 2,000 or greater, more preferably about 3,000 or greater, even more preferably about 6,000 or greater and most preferably about 10,000 or greater. The resulting polyether polyol preferably has a weight average molecular weight of about 20,000 or less, more preferably about 16,000 or less and most preferably about 14,000 or less. In the embodiment wherein the polyether polyol is used in a hydraulic fluid the polyether polyol preferably has a weight average molecular weight of about 20,000 or greater, more preferably about 25,000 or greater, and most preferably about 30,000 or greater. The resulting polyol preferably has a molecular weight of about 80,000 or less, more preferably about 60,000 or less and most preferably about 50,000 or less. In the embodiment wherein the polyether polyol is used as a lubricant the polyether polyol preferably has a weight average molecular weight of about 1,000 or greater, more preferably about 2,000 or greater, most preferably about 5,000 or greater. The resulting polyol preferably has a weight average molecular weight of about 20,000 or less, more preferably about 16,000 or less and even more preferably about 12,000 or less and most preferably about 10,000 or less. The resulting polyether polyol preferably has a polydispersity of about 1.20 or less and more preferably about 1.12 or less.

Preferably the polyether polyol of the invention corresponds to Formula 1:

wherein:
  $R^1$ is the residue of a compound having from about 1 to about 8 active hydrogen atoms;
  $R^2$ is independently in each occurrence hydrogen or a $C_{1-6}$ saturated or unsaturated hydrocarbon chain;
  m is independently in each occurrence a number such that the equivalent weight of the polyether polyol is from about 1,000 to about 20,000; and,
  p is independently in each occurrence from about 1 to 8.

Preferably $R^1$ is a $C_{1-8}$ alkyl or cycloalkyl moiety or oxygen. More preferably, $R^1$ is a $C_{2-4}$ alkyl group or oxygen. $R^2$ is preferably hydrogen, methyl or ethyl and most preferably hydrogen or methyl. In the embodiment where the polyether polyol is used to prepare an elastomeric composition, m is independently in each occurrence a number such that the equivalent weight of the polyol is from about 1,000 to about 20,000 and more preferably from about 5,000 to about 8,000. In the embodiment where the polyether polyol is used to prepare a hydraulic fluid, m is independently in each occurrence a number such that the equivalent weight of the polyol is from about 10,000 to about 30,000, and more preferably from about 10,000 to about 20,000. In the embodiment where the polyether polyol is used as a lubricant, m is independently in each occurrence a number such that the equivalent weight of the polyol is from about 2,000 to about 7,000, and more preferably from about 3,000 to about 5,000 more preferably from about 3,000 to about 4,000. P is preferably 4 or less and more preferably 3 or less. In the embodiment where $R^1$ is oxygen p must be 2.

The polyether polyols of the invention also demonstrate a low unsaturation level, preferably about 0.04 milliequivalents of unsaturation per gram of polyol or less and more preferably about 0.02 milliequivalents of unsaturation per gram of polyol or less.

The high molecular weight polyether polyols of this invention can be used to prepare reactive silicone functional prepolymers. Such prepolymers are prepared by reacting a high molecular weight polyether polyol of this invention with an isocyanato silane. Such isocyanato silane requires a silane group with a hydrolyzable moiety attached thereto. The isocyanato moiety of the isocyanato silane reacts with the active hydrogen atoms of the polyether polyol to place the reactive silicone containing moiety onto the polyol. Isocyanato silanes useful in the invention are described in U.S. Pat. No. 4,618,656 at column 3, lines 24 to 34 incorporated herein by reference. Preferably such isocyanato silanes correspond to the following formula

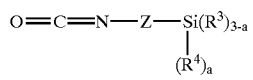

wherein:
  $R^3$ is independently in each occurrence a hydrolyzable moiety;
  $R^4$ is independently in each occurrence hydrogen or an hydrocarbyl moiety;
  a is independently in each occurrence an integer of from 0 to 2;
  P is independently in each occurrence a $C_{1-4C}$ divalent hydrocarbyl moiety.

In the above mentioned formula Z is preferably a $C_{1-20}$ divalent hydrocarbyl moiety, more preferably $C_{1-8}$ alkylene and most preferably $C_{1-3}$ alkylene. $R^3$ is preferably a hydrogen atom, a halogen atom, an alkoxy group, an acyloxy group, a ketoximate group, an amino group, an amide group, an acid amide group, an amino-oxy group, a mercapto group or an alkenyloxy group. Among them, a hydrogen atom, an alkoxy group, an acyloxy group, a ketoximate group, an amino group, an amide group, an arnino-oxy group, a mercapto group, or an alkenyloxy group are preferred. In particular, an alkoxy group, e.g., a methoxy group or ethoxy, is preferred because of its mild hydrolyzability and ease in handling. The reaction of an isocyanato silane with a polyol is well known to those skilled in the art.

Preferably the reactive silicone polymers correspond to the formula

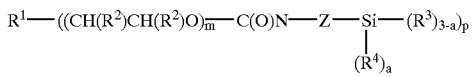

wherein $R^1$, $R^2$, $R^3$, $R^4$, Z, a, m and p are as defined hereinbefore.

The process for the preparation of a silyl terminated prepolymer comprises contacting a polyether polyol with an isocyanato silane having at least one silane moiety which has bonded thereto a hydrolyzable moiety under conditions such that the hydroxy moieties of the polyol react with isocyanate moieties of the silane so as to place a terminal silane moiety on the polyether polyol wherein the contacting is performed without the addition of catalyst. The reaction of the polyether polyol with an organo functional silane can be performed using conventional processes such as those disclosed in U.S. Pat. No. 4,625,012 incorporated herein by reference. The polyether polyols of the invention allow the preparation of silane terminated polyethers by the reaction of isocyanato silanes with the polyether polyols of the invention without the addition of additional catalysts. The residual calcium catalysts from the polyether polyol formation reaction sequence is sufficient to catalyze the reaction. After the reaction is complete the residual calcium catalyst can be neutralized with acid. If desired, a standard polyurethane catalyst such as those disclosed in U.S. Pat. No. 4,625,012 at column 5, lines 14 to 23 may be added. It is disadvantageous to add such catalysts as this may impact the stability of the prepolymer prepared negatively. It has been discovered that the prepolymer, if prepared in the absence of standard polyurethane catalysts, is stable to condensation if exposed to atmospheric moisture. Such a prepolymer can be used to prepare elastomers and adhesive compositions. Such elastomeric materials in adhesive compositions demonstrate better stability and elastomeric properties if prepared in the absence of additional polyurethane catalysts. The reaction of the isocyanato silane with a polyol preferably takes place at a temperature of about 0° C. or greater and more preferably about 25° C. or greater. The reaction preferably takes place at a temperature of about 150° C. or less and more preferably at about 80° C. or less. This reaction preferably is performed in an inert atmosphere such as under a nitrogen blanket. The reaction is allowed to proceed until the desired silane functionality is achieved. In a preferred embodiment a sufficient amount of isocyanato silane is used to react with all of the hydroxyl functionality contained in the polyol. In one embodiment a polyurethane prepolymer can be prepared from the polyether polyols of the invention. These prepolymers are prepared by the reaction of the polyethers polyols with a polyisocyanate (having 2 or more isocyanate moieties per molecule). This reaction is well known in the art. See Hsieh U.S. Pat. No. 5,852,137 incorporated herein by reference. A prepolymer having isocyanate functionality is prepared when there are excess isocyanate equivalents in the reaction as compared to active hydrogen containing moieties. The prepolymer will be hydroxyl functional if excess polyol is used as compared to isocyanate.

The prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent cross-linking of the isocyanate groups by atmospheric moisture. The reaction is preferably carried out at a temperature or about 0° C. or more and more preferably about 25° C. or greater. The reaction is preferably carried out at a temperature of about 150° C. or less and more preferably about 80° C. or less. The reaction is allowed to proceed until the residual isocyanate content determined by titration of a sample is very close to the desired theoretical value. The reaction to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate. In a preferred embodiment the residual catalyst from the polyol synthesis reaction is sufficient to catalyze the preparation of the prepolymer without the addition of another polyurethane catalyst.

The polyurethane prepolymers can be used in adhesive compostions such as disclosed in Risk U.S. Pat. No. 4,758, 648; Bhat U.S. Pat. No. 5,603,798; and Hsieh U.S. Pat. No. 5,852,137 incorporated herein by reference. Adhesive compositions containing polyurethane prepolymers prepared as described herein without the addition of a polyurethane catalyst demonstrate enhanced stability as compared to formulations where the prepolymer is prepared using a standard polyurethane catalyst.

In addition these polyurethane prepolymers form elastomers when cured by known curing agents or cross-linkers. The cross-linkers utilized in this invention include any cross-linker which is known and which preferably has an equivalent weight of about 200 or less. Cross-linkers as used herein refers to compounds which are also commonly referred to as chain extenders. Such cross-linkers are low molecular weight compounds having two active hydrogen atoms which react with isocyanate moieties. Preferred cross-linkers are $C_3$–$C_{10}$ alkylene diols, $C_3$–$C_{10}$ cycloalkylene diols, hydroquinone di(beta-hydroxyl ethyl)ether, ethoxylated bisphenol A, 4,4'-methylene bis(2-chloroaniline), 4,4'-methylenebis(3-chloro-2,6-diethylaniline), 3,5-dimethylthio-2,4-toluenediamine, 3,5-dimethylthio-2,6-toluenediamine, trimethylene glycol di-p-aminobenzoate and 1,4-bis(β-hydroxyethoxy)benzene. Examples of $C_3$–$C_{10}$ alkylene diols are 1,3-propanediol, 1,4-butanediol, 1,6-hexanediol, 2-ethyl-1,3-hexanediol, 2,2,4-trimethyl-1,3-pentanediol and 2-butyl-2-ethyl-1,3-propanediol. The cross-linking agents are present preferably in an amount of about 1 percent by weight or greater and more preferably about 5 percent by weight or greater based on the total weight of the formulation. Preferably, the cross-linking agent is present in an amount of about 30 percent by weight or less based on the total weight of the total formulation, and more preferably about 15 percent or less. The elastomers may be prepared in the presence of standard polyurethane catalysts. In addition, standard elastomeric additives may be present such as fillers and antioxidants. The elastomers may be formed at temperatures of about 15° C. or greater, more preferably about 20° C. or greater and most preferably about 25° C. or greater. Preferably, the elastomers are formed at a temperature of about 100° C. or less, more preferably about 40° C. or less. After formation the elastomers may be subjected to curing conditions. Such curing conditions include curing at about 80° C. or greater for about 1 hour or greater and may be subjected to post-curing at about 80° C. or greater and preferably about 100° C. or greater for about 12 hours or greater and preferably about 24 hours or greater.

In another embodiment of the invention the polyether polyols of the invention may be used as thickeners in water based hydraulic fluids. In such embodiments the alkylene oxides used to prepare the polyether polyols, are preferably ethylene oxide and propylene oxide and the initiator is preferably a di or tri functional initiator, more preferably a tri functional initiator. In a preferred embodiment the polyether polyol is a mixture of ethylene oxide and propylene oxide units in either block or random form. Preferably the ethylene oxide units are about 95 percent by weight or less of the polyether polyol and more preferably about 75 percent by weight or less of the polyether polyol. A sufficient amount of the polyether polyol is used to achieve the desired viscosity of the fluid. One standard lubricant grade is ISO VG 46 hydraulic fluid, which has a viscosity of 46 centistokes at 40° C. The polyether polyols of the invention exhibit the appropriate viscosity at less than about 30 percent by weight of polyether polyol in the formulation. Preferably, the formulation contains about 5 percent by weight or greater of polyol of the invention, more preferably about 10 percent by weight or greater of the polyether polyol and most preferably about 14 percent by weight or greater of polyether polyol. Preferably, the formulation has about 30 percent by weight or less of the polyether polyol, more preferably about 29 percent by weight or less of polyether polyol, even more preferably about 20 percent by weight or less and most preferably about 16 percent by weight or less. Preferably, the formulation contains about 70 percent by weight or greater of water, more preferably about 71 percent by weight or greater of water, more preferably about 80 percent by weight or greater of water and most preferably about 84 percent by weight or greater of water. Preferably the formulation has about 95 percent by weight or less of water, more preferably about 90 percent by weight or less of water and most preferably about 86 percent by weight or less of water. At higher ethylene oxide contents in the polyether polyol, the polyether polyol can phase separate from water at high temperatures. Under certain circumstances the polyether polyol will phase separate from the water base of the hydraulic fluid. In this embodiment the polyether polyol preferably has a ethylene oxide content of about 75 percent by weight or greater and more preferably a polyethylene oxide content of about 90 percent by weight or less and most preferably about 80 percent by weight or less. This phase separation preferably occurs at a temperature of about 50° C. or greater and most preferably at about 70° C. or greater and preferably at about 80° C. or less. This phase separation from the base fluid allows for easy recovery of the polyether polyol from used hydraulic fluid and is more environmentally friendly. The hydraulic fluids of the invention are more shear stable and the polyether polyols of the invention dissolve into the water solution easier than conventional polyols, i.e. the POLYOX polyethylene oxide based polyols.

Hydraulic fluids of the invention can further contain other components well known to those skilled in the art. Additives used in such hydraulic fluids are disclosed in U.S. Pat. No. 4,481,125, U.S. Pat. No. 4,312,768, U.S. Pat. No. 4,093,554, U.S. Pat. No. 4,391,722, U.S. Pat. No. 4,686,058, U.S. Pat. No. 5,326,485 and U.S. Pat. No. 4,702,854, (relevant portions incorporated herein by reference).

In one embodiment certain polyether polyols of the invention may be used as lubricants. In this embodiment the polyether polyol comprises the bulk of the lubricant. Common additives known to one skilled in the art may be mixed with the polyether polyol to prepare the lubricant.

The final lubricant or hydraulic fluid compositions of these embodiments may contain effective amounts of ashless additives, such as antioxidants, corrosion inhibitors, metal deactivators, lubricity additives, extreme pressure additives and viscosity modifiers as may be required. The polyether polyols used as lubricants are prepared as described before with the viscosity being monitored until the target viscosity is achieved. Lubricants having a viscosity of 1000 centistokes and 2000 centistokes at 40° C. can be prepared from the polyether polyols of the invention as described.

Examples of useful ashless antioxidants which can be used herein are phenyl naphthylamines, i.e., both alpha and beta-naphthyl amines; diphenyl amine; iminodibenzyl; p,p-dibutyl-diphenylamine; p,p-dioctyldiphenylamine; and mixtures thereof. Other suitable antioxidants are hindered phenolics such as 2-t-butylphenol, 2,6-di-t-butylphenol and 4-methyl-2,6-di-t-butylphenol and the like.

Examples of suitable ashless metal corrosion inhibitors are commercially available, such as IRGALUBE 349™ from Ciba-Geigy. This inhibitor compound is an aliphatic amine salt of phosphoric acid monohexyl ester. Other useful metal corrosion inhibitors are NA-SUL DTA™ and NA-SUL EDS™ from the King Industries, Inc. (dinonylnapthalene sulfonate, diethylenetriamine dinonylnapthalene sulfonate and ethylene diamine dinonylnapthalene sulfonate)and Sarcosyl O,N-methyl oelosarcosine, from Ciba, Inc.

Examples of suitable ashless cuprous metal deactivators are imidazole, benzimidazole, pyrazole, benzotriazole, tolutriazole, 2-methyl benzimidazole, 3,5-dimethyl pyrazole, and methylene bis-benzotriazole.

Examples of suitable viscosity modifiers are pentaeryritol tetrapelargonate and trimethyolpropane triheptonate.

An effective amount of the foregoing additives for use in a lubricant or a hydraulic fluid is generally in the range from about 0.1 to about 5.0 percent by weight for antioxidants, about 0.1 to about 5.0 percent by weight for the corrosion inhibitors, and about 0.001 to about 0.5 percent by weight for the metal deactivators. The foregoing weight percentages are based on the total weight of the polyether polyols. It is to be understood that more or less of the additives may be used depending upon the circumstance for which the final composition is to be used.

Unless otherwise stated all molecular weights as used herein are determined by titrating to determine the hydroxyl number and calculating the molecular weight according to the formula. If the molecular weight is designated as a number average molecular weight it is determined according to gel permeation chromatography.

Specific Embodiments

The following examples are included for illustrative purposes only and are not intended to limit the scope of the invention. Unless otherwise stated all parts and percentages are based on weight.

Example 1. Preparation of a high molecular weight polyether diol

A mixture of 97.3 grams of polyglycol P1000, a 1000 MW polypropylene oxide diol from which essentially all of the catalyst (KOH) had been removed, and 9.73 grams of 10 percent calcium, CEM ALL D10™ (about 50 percent by weight calcium isooctoate in mineral spirits carrier, and which contains no glycol ether stabilizers, available from OMG Americas, Cleveland, Ohio) was placed in a dry, steam heated and stirred pressure reactor which was then purged with nitrogen several times. The mixture was heated to 100° C. and 1,985 grams of propylene oxide was added with rapid stirring. The product was a liquid having an equivalent weight of 5,218 determined by a wet method for hydroxyl analysis. The number average molecular weight of the product was 9,978 as determined by gel permeation chromatography using polyglycol standards and a polydispersity of 1.1 determined by size exclusion chromatography.

Example 2. Preparation of a high molecular weight isocyanate prepolymer 300.35 grams of the polyglycol of Example 1 was mixed with 600 grams of toluene and stirred at 23° C. until well mixed. 8.2 milliliters of toluene diisocyanate were added and heated to 100° C. with stirring. After two hours the toluene was removed with vacuum. 308 grams of a clear viscous light yellow liquid were recovered. The IR spectrum of the product isocyanate peak at 2274 CM-1 was greatly reduced and the urethane peak at 1650 CM-1 increased indicating that most of the isocyanate had reacted. This NCO concentration of ,this mixture was 0.69 percent measured by a wet chemical method.

Example 3. Preparation of a high molecular weight urethane elastomer 1.7 grams dibutyl tin dilaurate (CATACHK 820υ from Ferro Chemical Corp.) were added to 170 grams of the product of example 2. The mixture was mixed well. A 30 milliliter film was cast on glass plates and allowed to cure overnight at 23° C. The film demonstrated good adhesion to the glass plates. The elastomer was cured in a 70 percent relative humidity chamber for 4 days. The average physical properties of the elastomer (5 replicates) were 301 psi tensile strength, modulus 11.44 psi, 0.64 pounds load at tear and a 934 percent elongation at break.

Example 4. Preparation of high molecular weight silyl terminated polyether

In a dried, heated, nitrogen purged and mechanically stirred 500 milliliter round bottom flask was added 134.94 grams of the product of Example 1, 6.33 grams of Siliquest A1310, gamma-isocyanatopropyltriethoxysilane, and 1.52 grams dibutyl tindilaureate. The mixture was heated to 100° C. with stirring and immediately allowed to cool to room temperature. A 30 milliliter film was drawn on glass plates. The film was allowed to moisture cure overnight. The film was tack free in about 24 hours. The film was placed in a 70 percent humidity chamber for 5 days and then placed in an oven at 50° C. overnight. The cured film had a 73 psi tensile strength, 35 psi modulus, and a 347 percent elongation at break.

Example 5. Preparation of an ISO VG 1000 Lubricant

A mixture of 792 grams of polyglycol PB200, a 910 molecular weight polypropylene oxide monol initiated with n-butanol, from which essentially all of the catalyst (KOH) had been removed, and 25.3 grams of 10 percent Calcium CEM ALL D10υ was placed in a dry steam heated and stirred pressure reactor which was then purged with nitrogen several times. The mixture was heated to 100° C. and 5,230 grams of propylene oxide was added with rapid stirring. The product was a liquid having an equivalent weight of 4,968 determined by a wet method for hydroxyl analysis. The number average molecular weight of the product was 5,000. The polydispersity was 1.26 as determined by size exclusion chromatography. The 100° F. viscosity was 1,182 cS and the 210° C. viscosity was 162.2 cS. The calculated 40° C. viscosity was 1182 cS. This is an ISO viscosity grade of 1000.

Example 6. Preparation of a water soluble high molecular weight polyether triol

A 2 gallon reactor was charged with 92 grams glycerin (1 mole) and 250 grams 10 percent Calcium CEM-ALL DIOT™. The reactor was purged with nitrogen. 2,480 grams of a 75/25 w/w (weight/weight) EO/PO (ethylene 2S oxide/propylene oxide) mixture was fed at 100° C. Of the 2,823 grams in the reactor, 2,230 grams was removed. To the 593 grams remaining in the reactor, 2,950 grams of the mixed oxide was fed at 100° C. Of the 3,543 grams in the reactor, 2,985 grams was removed (the product is referred hereinafter as Example 6 Run 2). To the 558 grams remaining in the reactor, 2790 grams of mixed oxide was fed at 100° C. The contents of the reactor were drained, (the product is referred hereinafter as Example 6 Run 3). The polymer was so viscous that an accurate mass balance was not possible.

Example 7. Preparation of a high molecular weight triol capped with a polyethylene oxide chain The final polyether polyol reaction product of Example 6 Run 2 was stripped at 90° C. to remove volatiles. A polyether polyol was made by initiating a reaction (500 g) of the product of Example 6 Run 2 dissolved in toluene (600 g). 2485 grams of EO were added at 100° C. to make an EO capped polyol. The percent hydroxyl of the polyols of Example 6 Run 2, Example 6 Run 3 and Example 7 polyether polyols were determined and the results are compiled in Table 1.

TABLE 1

| POLYOL | % HYDROXYL | CALCULATED* MOL. WT. | BASICITY mg KOH/g |
|---|---|---|---|
| Example 6 Run 2 | 0.4972 | 10,258 | n.d. |
| Example 6 Run 3 | 0.1634 | 31,212 | 0.015 |
| Example 7 | 0.1813 | 28,130 | 0.008 |

*Calculated from the percent hydroxyl corrected for basicity.

The viscosity of water solutions of several polyols were determined in Cannon-Fensky tubes in a thermostatted bath. The results are compiled in Table 2.

TABLE 2

| | 40° C. Viscosity (cS) of Water Solutions | | | |
|---|---|---|---|---|
| Percent of Polyol in Water | Example 6 Run 2 | Example 6 Run 3 | Example 7 | PG 6000** |
| 10% Solution | 4.6 | 17.6 | 15.0 | 2.3 |
| 20% Solution | 11.7 | 123.7 | 96.6 | 7.1 |
| 30% Solution | 31 | 675 | 1484.7 | 18.6 |
| 50% Solution | 180 | 7973 | n.d. | 107 |

**Comparison PG6000 is n-butanol initiated 50/50 EO/PO based polyol with a MW of about 5,600.

Several polyols were used to formulate an ISO VG 46 Fluid. The polyol concentrations in water to achieve an ISO VG 46 fluid are compiled in Table 3.

TABLE 3

| Polyglycol | Concentration, % |
|---|---|
| Example 6 Run 3 | 15.0 |
| Example 6 Run 2 | 34.9 |
| Synalox 25D700 | 43 |
| Synalox 25-300B | 49 |
| Synalox 25-220B | 53 |
| Terralox HP400 | 64 |
| Terralox HP670 | 71 |
| Terralox HP4800 | 73 |
| PEO 200,000 | 4 |
| PEO 100,000 | 9 |
| AQUAZOL 500 | 10 |
| AQUAZOL 200 | 15 |
| CARBOWAX 20M | 19 |
| UCON 75H380,000 | 23 |
| UCON 75H90,000 | 28 |
| PG 6000 | 40 |

Synalox 25D700™ is dipropylene glycol initiated polyol having a polyether chain comprising 65/35 w/w/ EO/PO and having a molecular weight of 5500 MW, available from The Dow Chemical Company.

Synalox 25-300B™ is dipropylene glycol n-butylether initiated polyol having a polyether chain comprising 75/25 w/w EO/PO and having a molecular weight of 3450 MW available from The Dow Chemical Company.

Synalox 25-220B™ is dipropylene glycol n-butylether initiated polyol having a polyether chain comprising 75/25 w/w EO/PO and having a molecular weight of 3100 available from The Dow Chemical Company.

Terralox HP400™ is sorbitol initiated ethylene oxide polyol having on average 18 moles of ethylene available from The Dow Chemical Company.

Terralox HP670™ is 31/69 w/w glycerin/sucrose initiated propylene oxide polyol having a molecular weight of 500 MW available from The Dow Chemical Company.

Terralox HP4800™ is 5/95 w/w glycerin/sucrose initiated propylene oxide polyol having molecular weight of 1000 available from The Dow Chemical Company.

PEO 200,000™ is polyethylene oxide having a molecular weight of approximately 200,000 available from Aldrich Chemical.

PEO 200,000™ is polyethylene oxide having a molecular weight of approximately 100,000 available from Aldrich Chemical.

CARBOWAX 20M™ is a polyethylene oxide having a molecular weight of about 20,000 available from Union Carbide.

AQUAZOL 500™ is a poly(2-ethyl-2-oxazoline) available from Polymer Laboratories having a molecular weight of 500,000.

AQUAZOL 200™ is a poly(2-ethyl-2-oxazoline) available form Polymer Laboratories having a molecular weight of 200,000.

UCON 75H 380,000™ is a polyethylene oxide containing 75/25 EO/PO available from Union Carbide.

UCON 75H 90,000™ is a polyethylene oxide containing 75/25 EO/PO having a molecular weight of 15,000 available from Union Carbide.

PG 6000™ is a n-butanol initiated 50/50 PO/EO polyol having a molecular weight of about 5600 available from Dow Chemical.

The effect of temperature on the solution viscosity of the polyol of Run 3 of Example 6 is illustrated in Table 4.

TABLE 4

| Temperature, °C. | Viscosity, cS |
|---|---|
| 25 | 70 |
| 37.8 | 50.6 |
| 40 | 48.1 |

The data in Table 4 demonstrates that polyether polyols of the invention demonstrate good ability to maintain viscosity with increasing temperature.

The polyol of Example 6 Run 3 separated near 50° C. (75/25 EO/PO).

The 100,000 and 200,000 polyethylene oxide polyols heated to 90° C. without any separation of the polymer from the water, the heating was stopped due to boiling.

The effect of pH on the solution viscosity of the polyol of Example 6 Run 3 was determined. After vacuum stripping the polyol of Example 6 Run 3 gave a neutral pH. HCl was used to acidify and KOH was added to basify the polyol. The viscosity of the polyols was examined at 3 pH levels. The results are compiled in Table 5.

TABLE 5

| pH Concentration | Viscosity, cS @ 40° C. Ex. 6 Run 3 15% | Viscosity, cS @ 40° C. AQUAZOL 500 10% |
|---|---|---|
| 2.5 | 45.7 | 57 |
| 7.3 | 46.5 | 57 |
| 11.9 | 44 | 49 |

Table 5 shows that changes in pH do not affect the viscosity of the polyether polyols as much as it affects the viscosoty of poly(2-ethyl-2-oxazoline).

Example 8

Experiments were performed to evaluate the use of solid calcium catalyst prepared by the method of U.S. Pat. No. 4,329,047 with catalysts made according to this invention.

TABLE 6

| Catalyst Composition | | |
|---|---|---|
| Components | Example 8 | Comparative Example |
| Calcium Naphthanate | 0 | 35 |
| Calcium Isooctoanate | 50 | 0 |
| Mineral Spirits | 0 | 60 |
| Mineral Spirits | 50 | 0 |
| 2-Ethoxyethanol | 0 | 5 |
| Calcium Conc., % | 10 | 4 |

*Both catalyst obtained from OMG Americas, Inc.

The catalyst of Example 8 contains 50 weight percent calcium isooctoanate, with synthetic isooctoanoic acid of high purity, and 50 weight percent mineral spirits. The catalyst of Example 8 contains 10 weight percent calcium and does not contain any glycol ethers.

The catalyst of the Comparative Example contains 35 weight percent calcium naphthenate, 60 weight percent mineral spirits and 5 weight percent 2-ethoxyethanol, a glycol ether. It also contains 4 weight percent calcium. It is representative of the catalyst used in example 1 of Yates U.S. Pat. No. 4,329,047 and prepared according to the teachings of the patent.

Preparation of Solid Calcium Naphthanate Catalyst Comparative Example

Acetone, 2928.6 grams was added to a 4 L, stirred beaker. The catalyst of the Comparative Example as described in Table 6, 207.79 grams was added slowly to prevent agglomeration. The white percipitate was allowed to settle for 1 hour. The acetone was decanted and the residual volatiles were removed at room temperature with vacuum. 116.98 grams of a thick semi-solid product was recovered.

Preparation of Polyglycol with Solid Calcium Naphthanate Catalyst

Polyglycol P425, 425 molecular weight propylene oxide diol, 98.69 grams was mixed with 15.69 of the solid Catalyst of the Comparative Example prepared as described above. The solid catalyst was not soluble in the propylene oxide diol. The mixture was added to a dry, 2 gallon, steam heated, stirred, pressure reactor. The reactor was nitrogen purged to remove oxygen. Propylene oxide, 5,740 grams was added over 5 days at a temperature of 120° C. Almost no reaction was observed for the first 2 days.

Preparation of Polyglycol with Liquid Calcium Isooctoanate Catalyst, Example 8

Polyglycol P425, 344.1 grams was added to a dry, 5 gallon, steam heated, stirred, pressure reactor. Catalyst of Example 8, 110.1 grams was added to the reactor. The reactor was nitrogen purged to remove oxygen. Propylene oxide, 5,740 grams was added over 20 hours at a temperature of 120° C. An initial time of slow oxide feed rate for two hours was observed.

TABLE 7

Production Data

| Run Number | Ex. 8 Run 1 | Ex. 8 Run 2 | Comp Ex. Run 1 | Comp. Ex Run 2 |
|---|---|---|---|---|
| Catalyst Physical State | liquid | liquid | solid | solid |
| Acid | Isooctoanate | Isooctoanate | Isooctoanate | Naphthanate |
| Initiator | P425 | P425 | P425 | P425 |
| Initiator (g) | 342.2 | 341.1 | 278 | 98.69 |
| Catalyst (g) | 111.3 | 110.1 | 50.6 | 15.69 |
| Reaction Temperature | 120° C. | 120° C. | 120° C. | 120° C. |
| Feed Times* | t.b.d. | 20 hrs | t.b.d. | 120 hrs |
| PO (g) | 19,865 | 19,805 | 16,155 | 5,740 |
| total wt. = | 20,319 | 20,256 | 16,484 | 5,854 |
| Unit Ratios | | | | |
| Initiator | 1.68 | 1.68 | 1.69 | 1.69 |
| Catalyst | 0.55 | 0.54 | 0.31 | 0.27 |
| PO | 97.77 | 97.77 | 98.01 | 98.05 |

*Actual oxide feed times not including digest and wait times

Example 8 Runs 1 and 2 and Comparative Example Run 1 were performed in a 5 gallon reactor. Comparative Example Run 2 was performed in a 2 gallon reactor. The reaction temperature was the same for all of the runs. The unit ratios of active catalyst, initiator and propylene oxide is the same for all of the runs. The feed times for the solid catalyst runs were longer than for the liquid catalyst runs. The initial period of slow oxide addition was also longer for the solid catalyst runs. The solid catalyst of the Comparative Example runs was insoluble in the polyglycol P425 initiator.

TABLE 8

Properties Of Polyether Polyols

| Example | Ex. 8 Run 1 | Ex. 8 Run 2 | Comp. Ex. Run 1 | Comp. Ex. Run 2 |
|---|---|---|---|---|
| Analytical | | | | |
| % OH meas. | 0.2817 | 0.2591 | 0.3088 | 0.44 |
| Unsaturation | 0.016 | 0.003 | 0.014 | 0.033 |
| Basicity | 0.0280 | 0.0205 | 0.0145 | 0.0136 |
| % OH cor.[1] | 0.2341 | 0.2243 | 0.3634 | 0.4169 |
| Calc. MW[2] | 14,524 | 15,158 | 9,357 | 8,156 |
| Unsat.cor[3] | 0.016 | 0.009 | 0.03 | 0.03 |
| 100 F Vis | 5,906 | 7,518 | 8,163 | 3,283 |
| SEC | | | | |
| Mn | 11,342 | 11,738 | 10,544 | 8,394 |
| Polydispersity | 1.073 | 1.046 | 1.077 | 1.204 |

[1]% OH corrected for basicity
[2]Molecular weight calculated for the % OH corrected assuming functionality is 2.
[3]Unsaturation, meq/g, corrected for basicity The polyether polyols made with the solid catalyst, (Comparative Examples), were lower in molecular weight determined by a wet chemical method and higher in unsaturation than the polyether polyols made with the liquid catalyst, Catalyst of the invention. The number average molecular weight (Mn) determined by size exclusion chromatography of the polyether polyols made with the solid catalyst were lower than the polyether polyols-inade with the liquid catalyst. The polydispersity of the polyether polyols made with the solid calcium naphthanate catalyst was much higher than the polyether polyols made with the liquid calcium isooctoanate catalyst. The polyether polyols of Example 8 Run 2 and Comparative Example were tested by size exclusion chromatography the results are illustrated in FIG. 1.

The polyether polyol made with the solid calcium naphthanate catalyst, Comparative Example Run 2, contained more low molecular weight species than Example 8 Run 2 made with the liquid calcium isooctoanate catalyst. This is shown in FIG. 1. Comparative Example Run 2, polyether polycol made with the solid calcium naphthanate catalyst contained 22 weight percent of species with molecular weights below 10,000 Dalton. In comparison, Example 8 Run 2 made with the liquid calcium isooctoanate catalyst had only about 10 percent by weight of species below 10,000 Dalton. This is the cause of the low molecular weight determination, the high polydispersity and the low viscosity of the polyether polyol of Comparative Example Run 2. The low molecular weight species adversely affects the elongation properties of an elastomer made with this polyether polyol. The polyether polyol made with solid calcium isooctoanate (Comparative Example Run 1) exhibited the same deficiencies as the solid calcium naphthanate prepared polyether polyol but to a lesser degree.

The conclusion is that using a solid catalyst in the production of high molecular weight polyether polyols has several disadvantages: solid catalysts are difficult to handle in manufacturing plants; solid catalysts have a longer initial time of slow oxide feed compared to liquid catalysts; solid catalysts have longer feed times than liquid catalysts; solid catalysts make a polyether polyol with a higher polydispersity than liquid catalysts, especially the calcium naphthanate catalyst. Solid catalysts make more lower molecular weight species than liquid catalysts, especially the calcium naphthanate catalyst.

What is claimed is:

1. An adhesive composition comprising a silyl terminated prepolymer comprising the reaction product of a polyol prepared by the reaction of one or more compounds having one or more active hydrogen atoms with one or more alkylene oxides in the presence of a catalyst consisting of calcium having counterions of carbonate and a $C_{6-10}$ alkanoate in a solvent which does not contain active hydrogen atoms wherein the polyol prepared has an equivalent weight of from about 1,000 to about 20,000, a polydispersity of 1.30 or less and a residual catalyst level of from about 200 to about 1,000 ppm with an isocyanato silane having at least one silane moiety which as bonded thereto a hydrolyzable silane moiety.

2. An adhesive composition according to claim 1 which corresponds to the formula:

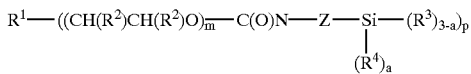

wherein:
- $R^1$ is the residue of a compound having from about 1 to about 8 hydrogen atoms;
- $R^2$ is hydrogen or a $C_{1-6}$ saturated or unsaturated hydrocarbon chain;
- $R^3$ is independently in each occurrence a hydrolyzable moiety;
- $R^4$ is independently in each occurrence hydrogen or an hydrocarbyl moiety;
- Z is independently in each occurrence a $C_{1-40}$ divalent hydrocarbyl moiety;
- a is separately in each occurrence an integer of from 0 to 2;
- m is independently in each occurrence a number such that the equivalent weight of the polyol is from about 1,000 to about 20,000; and
- p is independently in each occurrence a number of from about 1 to about 8 wherein the polyol used to prepare the prepolymer has an equivalent weight of from about 1,000 to about 20,000, a polydispersity of 1.20 or less and a residual catalyst level of from about 200 to about 1,000 ppm.

3. An adhesive composition according to claim 1 wherein the polyol corresponds to the formnula:

wherein:
- $R^1$ is the residue of a compound having from about 1 to about 8 active hydrogen atoms or oxygen;
- $R^2$ is independently in each occurrence a hydrogen or a $C_{1-6}$ saturated or unsaturated hydrocarbon chain;
- m is independently in each occurrence a number such that the equivalent weight of the polyol is from about 1,000 to about 20,000; and
- p is independently in each occurrence from about 1 to 8.

4. An adhesive composition according to claim 3 wherein:
- $R^1$ is independently in each occurrence a $C_{1-8}$ alkyl or cycloalkyl moiety or oxygen;
- $R^2$ is independently in each occurrence hydrogen, methyl or ethyl; and
- p independently in each occurrence 4 or less.

5. An adhesive composition according to claim 4 wherein:
- $R^2$ is independently in each occurrence hydrogen or methyl; and
- p is independently in each occurrence 3 or less.

6. An adhesive composition according to claim 5 wherein the polyol has a polydispersity of 1.20 or less and an unsaturation level of 0.04 meq/g or less.

7. An adhesive composition according to claim 6 wherein the residual catalyst in the polyol is from about 300 to about 800 ppm.

8. An adhesive composition according to claim 6 wherein the polyol has a weight average molecular weight of about 3,000 to about 16,000.

9. An adhesive composition according to claim 3 wherein the isocyanto silanes correspond to the following formula

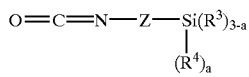

wherein:
- $R^3$ is independently in each occurrence a hydrolyzable mioiety;
- $R^4$ is independently in each occurrence hydrogen or an hydrbocarbyl moiety;
- a is independently in each occurrence an integer of from 0 to 2.
- Z is independently in each occurrence a $C_{1-40}$ divalent hydrocarbyl moiety.

10. An adhesive composition comprising a silyl terminated prepolymer comprising the reaction product of a polyol prepared by the reaction of one or more compounds having one or more active hydrogen atoms with one or more alkylene oxides in the presence of a catalyst consisting of calcium having counterions of carbonate and a $C_{6-10}$ alkanoate in a solvent which does not contain active hydrogen atoms wherein the polyol prepared has an equivalent weight of from about 1,000 to about 20,000, a polydispersity of 1.30 or less and a residual catalyst level of from about more than 0 to about 1,000 ppm with an isocyanato silane having at least one silane moiety which as bonded thereto a hydrolyzable silane moiety.

11. An adhesive composition according to claim 10 which corresponds to the formula:

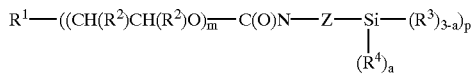

wherein:
- $R^1$ is the residue of a compound having from about 1 to about 8 hydrogen atoms;
- $R^2$ is hydrogen or a $C_{1-6}$ saturated or unsaturated hydrocarbon chain;
- $R^3$ is independently in each occurrence a hydrolyzable moiety;
- $R^4$ is independently in each occurrence hydrogen or an hydrocarbyl moiety;
- Z is independently in each occurence a $C_{1-40}$ divalent hydrocarbyl moiety;
- a is separately in each occurrence an integer of from 0 to 2;
- m is independently in each occurrence a number such that the equivalent weight of the polyol is from about 1,000 to about 20,000; and p is independently in each occurrence a number of from about 1 to about 8 wherein the polyol used to prepare the prepolymer has an equivalent weight of from about 1,000 to about 20,000, a polydispersity of 1.20 or less and a residual catalyst level of more than 0 to about 1,000 ppm.

12. An adhesive composition according to claim 11 wherein the polyol corresponds to the formula:

$$R^1-((CH(R^2)CH(R^2)O)_m-H)_p$$

wherein:
- $R^1$ is the residue of a compound having from about 1 to about 8 active hydrogen atoms or oxygen;
- $R^2$ is independently in each occurrence a hydrogen or a $C_{1-6}$ saturated or unsaturated hydrocarbon chain;
- m is independently in each occurrence a number such that the equivalent weight of the polyol is from about 1,000 to about 20,000; and
- p is independently in each occurrence from about 1 to 8.

13. An adhesive composition according to claim 12 wherein:
- $R^1$ is independently in each occurrence a $C_{1-8}$ alkyl or cycloalkyl moiety or oxygen;
- $R^2$ is independently in each occurrence hydrogen, methyl or ethyl; and
- p independently in each occurrence 4 or less.

14. An adhesive composition according to claim 13 wherein:
- $R^2$ is independently in each occurrence hydrogen or methyl; and
- p is independently in each occurrence 3 or less.

15. An adhesive composition according to claim 14 wherein the polyol has a polydispersity of 1.20 or less and an unsaturation level of 0.04 meq/g or less.

16. An adhesive composition according to claim 15 wherein the residual catalyst in the polyol is from about 300 to about 800 ppm.

17. An adhesive composition according to claim 16 wherein the polyol has a weight average molecular weight of about 3,000 to about 16,000.

18. An adhesive composition according to claim 17 wherein the isocyanto silanes correspond to the following formula $$O=C=N-Z-Si(R^3)_{3-a}$$
$$(R^4)_a$$

wherein:
- $R^3$ is independently in each occurrence a hydrolyzable moiety;
- $R^1$ is independently in each occurrence hydrogen or an hydrocarbyl moiety;
- a is independently in each occurrence an integer of from 0 to 2;
- Z is independently in each occurrence a $C_{1-40}$ divalent hydrocarbyl moiety.

* * * * *